(12) United States Patent
Kobayashi

(10) Patent No.: US 10,511,251 B2
(45) Date of Patent: Dec. 17, 2019

(54) SOLAR CELL PANEL SECURING STRUCTURE AND SECURING UNIT

(71) Applicant: Yanegijutsukenkyujo Co., Ltd., Takahama-shi, Aichi (JP)

(72) Inventor: Shuichi Kobayashi, Takahama (JP)

(73) Assignee: Yanegijutsukenkyujo Co., Ltd., Takahama-shi (JP)

( * ) Notice: Subject to any disclaimer, the term of this patent is extended or adjusted under 35 U.S.C. 154(b) by 0 days.

(21) Appl. No.: 16/152,095

(22) Filed: Oct. 4, 2018

(65) Prior Publication Data

US 2019/0190437 A1 Jun. 20, 2019

(30) Foreign Application Priority Data

Dec. 18, 2017 (JP) ................................. 2017-241662

(51) Int. Cl.
| | |
|---|---|
| *H02S 20/23* | (2014.01) |
| *H02S 20/30* | (2014.01) |
| *F24S 25/30* | (2018.01) |
| *F16B 5/06* | (2006.01) |
| *H02S 20/20* | (2014.01) |
| *F24S 25/33* | (2018.01) |

(52) U.S. Cl.
CPC .............. *H02S 20/23* (2014.12); *H02S 20/30* (2014.12); *F16B 5/065* (2013.01); *F24S 25/30* (2018.05); *F24S 25/33* (2018.05); *H02S 20/20* (2014.12)

(58) Field of Classification Search
CPC .. F24S 25/00; F24S 25/30; F24S 25/33; F24S 25/40; F24S 25/61; F16B 5/065; F16B 5/02; F16B 2/12; H02S 20/10; H02S 20/20; H02S 20/22; H02S 20/23; H02S 20/24; H02S 20/30
See application file for complete search history.

(56) References Cited

U.S. PATENT DOCUMENTS

| | | | | |
|---|---|---|---|---|
| 7,915,519 | B2 * | 3/2011 | Kobayashi | .............. H02S 20/23 136/251 |
| 8,453,394 | B2 | 6/2013 | Kobayashi | |
| 8,495,839 | B2 * | 7/2013 | Tsuzuki | .................. H02S 20/23 52/173.3 |
| 8,938,932 | B1 * | 1/2015 | Wentworth | ............. H02S 20/23 52/747.1 |
| 9,431,953 | B2 * | 8/2016 | Stearns | .................... H02S 20/23 |
| 2011/0047903 | A1 | 3/2011 | Kobayashi | |
| 2016/0308486 | A1 * | 10/2016 | Atia | ........................ H02S 20/23 |
| 2019/0013772 | A1 * | 1/2019 | Barnat | ..................... H02S 20/23 |
| 2019/0131918 | A1 * | 5/2019 | Kobayashi | .............. H02S 20/23 |
| 2019/0273460 | A1 * | 9/2019 | Kovacs | ................... H02S 20/10 |

FOREIGN PATENT DOCUMENTS

| | | | |
|---|---|---|---|
| JP | 4365450 | B1 | 11/2010 |
| JP | 4975893 | B1 | 7/2012 |

* cited by examiner

*Primary Examiner* — Phi D A
(74) *Attorney, Agent, or Firm* — Ken I Yoshida

(57) ABSTRACT

In a securing unit including first frames for holding the end sides of a solar cell and a securing tool, the securing tool includes a base member that is secured to an installation face, a stand that is erected from the base member, a shaft that has an external thread and is held by the stand in a state in which a movement in the axial direction is restricted, and a holder that holds the first frame by inserting a lateral side extended portion into a slit of the first frame and moves up and down relatively to the stand by screwing internal threads formed in the holder together with the external thread of the shaft.

2 Claims, 11 Drawing Sheets

SOLAR CELL PANEL SECURING STRUCTURE AND SECURING UNIT

BACKGROUND OF THE INVENTION

Field of the Invention

The present invention relates to a solar cell panel securing structure in which solar cell panels are secured to an installation face such as a roof face with securing tools, and a securing unit that is used for the securing structure.

Description of the Related Art

As a securing structure in which a solar cell panel is secured to an installation face such as a roof face with securing tools through frames holding the peripheral edges of the solar cell panel, the present applicant has proposed a structure using securing tools that are attached to frames in a slidable manner (for example, see Patent document 1, which is Japanese Patent No. 4365450). In the securing structure, at least one pair of frames of two pairs of frames that respectively hold two pairs of sides of a square solar cell panel have slits extending in the lengthwise direction in side surface portions, and each of the securing tools has a portion to be inserted into the slit.

Mounting positions of the securing tools can be determined by causing the securing tools to slide along the slits of the frames. Therefore, an operation of previously positioning and securing the securing tools on the installation face in accordance with a mounting pitch of the securing tools on the solar cell panel is not required. Fastening members such as screws and nails for securing the securing tools to the installation face are desirably driven into hard portions on the installation face. When the installation face is, for example, a roof face, the hard portions are portions supported on balks. The fastening members can be easily adjusted so as to be located on the hard portions on the installation face by causing the securing tools to slide along the slits of the frames, thereby increasing the strength of the securing structure.

Furthermore, as the above-described securing tool, the present applicant also has proposed a securing tool that is separated into a first securing member and a second securing member (see Patent document 2, which is Japanese Patent No. 4975893). The first securing member supports a frame holding the solar cell panel, the second securing member is secured to an installation face, and the first securing member and the second securing member are coupled to each other by a bolt. When the securing tool is integrally configured, holes are bored in the installation face by screws and nails every time the solar cell panel is detached and secured again in the case such as an exchange of the solar cell panel. This arises the risk that the mechanical strength of the securing structure is lowered. On the other hand, with the securing tool capable of separating the first securing member from the second securing member, the solar cell panel can be secured to or detached from the installation face by coupling or releasing the first securing member to or from the second securing member while the second securing member is kept being secured to the installation face. Accordingly, the solar cell panel can be repeatedly detached and mounted again from and to the installation face without the risk of lowering of the mechanical strength of the securing structure.

In addition, the securing tool in Patent document 2 has a plurality of spacers disposed between the first securing member and the second securing member. The plurality of spacers are engaged with each other and with the second securing member so as to be interposed between the first securing member and the second securing member without positional deviation. When the installation face is the roof face, the heights of the plurality of solar cell panels are non-uniform in some cases depending on securing positions on the roof face due to the shape of a roof covering material. Furthermore, the height of the solar cell panel may be desired to be changed in consideration of relations with other structures on the installation face. In these cases, the height of the solar cell panel can be adjusted by changing the number of spacers or presence or absence of the spacer to be interposed between the first securing member and the second securing member.

Height adjustment with the spacers however has a difficulty in finely adjusting the height because they are non-continuous based on the thickness of each spacer as a unit. Moreover, when the number of spacers is increased or decreased, a state in which a space between the first securing member and the second securing member is enlarged by lifting the first securing member needs to be kept. For these reasons, it is difficult to adjust the height in a state in which the solar cell panel is held on the first securing member or a plurality of operators are required.

Patent document 1: Japanese Patent No. 4365450
Patent document 2: Japanese Patent No. 4975893

SUMMARY OF THE INVENTION

The present invention has been made in consideration of the above-mentioned circumstances, and an object thereof is to provide a solar cell panel securing structure enabling an easier operation of securing solar cell panels to an installation face with securing tools and enabling fine height adjustment, and a securing unit that is used for the securing structure.

In order to achieve the above-mentioned object, a solar cell panel securing structure (hereinafter, simply referred to as a "securing structure" in some cases) according to an aspect of the present invention is "a solar cell panel securing structure in which a pair of end sides of each solar cell panel is held by a pair of first frames and the first frames are secured to an installation face through securing tools,
wherein each of the first frames includes:
an upper abutment portion that abuts against an upper surface of the solar cell panel;
a side surface portion that extends downward from one end of the upper abutment portion;
an installation surface that extends from a halfway height position of the side surface portion in parallel with the upper abutment portion and holds the solar cell panel between the installation surface and the upper abutment portion in a state in which the solar cell panel is installed on the installation surface;
a slit that is opened at a halfway height position of the side surface portion below the installation surface and extends in a lengthwise direction of the first frame; and
a lower abutment portion that extends from a lower end of the side surface portion in parallel with the upper abutment portion,
each of the securing tools includes a base member that is secured to the installation face, a stand that is erected from the base member, a holder that is movable up and down relatively to the stand, and a shaft on which an external thread is formed on an outer circumferential surface, the stand has a pair of side wall portions and holds the shaft between the side wall portions in a state of restricting movement of the shaft in an axial direction, the shaft is exposed from the stand in a radial direction of the external thread and has a tool engaging portion on an end portion, the holder includes:
a frame support portion that is formed into a planar shape and through which a tool hole portion is formed;
an upper standing wall portion that extends upward at a position deviating from the tool hole portion on the frame support portion;
a lateral side extended portion that is formed by a first extended portion and a second extended portion extending from an upper end of the upper standing wall portion in both of directions orthogonal to the upper standing wall portion;
a pair of lower standing wall portions that extends downward from the frame support portion with the tool hole portion interposed between the lower standing wall portions;
internal threads that are formed on the pair of lower standing wall portions at positions facing each other;
a connecting portion that connects the pair of lower standing wall portions; and
an insertion hole that is formed through the connecting portion,
the external thread exposed from the stand inserted through the insertion hole is screwed together with the internal threads,
the tool hole portion is located on an extended line of a center axis of the shaft and a hole portion or a space is formed on the extended line between the shaft and the tool hole portion in the stand; and
the respective lower abutment portions of the two first frames that respectively hold the adjacent solar cell panels are installed on the frame support portion in a state in which the first extended portion of the securing tool has been inserted into the slit of one of the first frames and the second extended portion of the same securing tool has been inserted into the slit of the other one of the first frames."

The "installation face" can be an inclined roof face or a horizontal roof face. In this case, roof can be slate roof, metal roof, or tile roof. The "installation face" is not limited to the roof face and may be an inclined face or a horizontal face exclusive for installation of the solar cell panel.

In the securing structure having this configuration, the two first frames that respectively hold the adjacent solar cell panels are secured to the installation face with the securing tool arranged therebetween. That is to say, in the state in which the first extended portion of the securing tool has been inserted into the slit of the first frame of one of the adjacent solar cell panels, the second extended portion of the same securing tool has been inserted into the slit of the first frame of the other one of the adjacent solar cell panels, and the lower abutment portions of both of the first frames have been installed on the frame support portion of the securing tool, the securing tool is secured to the installation face, so that the adjacent solar cell panels are secured to the installation face.

Each of the securing tools includes the base member that is secured to the installation face, the stand that is erected form the base member, and the holder that holds the first frames. In the securing tool, the holder is moved up and down relatively to the stand, thereby adjusting the height of the solar cell panel through the first frame held by the holder.

To be specific, in the state in which the stand has been inserted through the insertion hole of the holder, the tool hole portion provided in the holder is located on the extended line of the center axis of the shaft and the hole portion or the space is provided on the extended line of the shaft in the stand holding the shaft. Therefore, the tool inserted into the tool hole portion is caused to reach the tool engaging portion of the shaft to be engaged with the tool engaging portion and rotate the shaft. Portions of the external thread of the shaft, which are exposed from the stand in the radial direction, are screwed together with the internal threads provided on the holder. The stand restricts movement of the shaft in the axial direction. Therefore, when the shaft is rotated, the holder is moved up and down without up and down movement of the shaft itself. In the holder, the upper standing wall portion from which the lateral side extended portion (the first extended portion and the second extended portion) for holding the first frames extends in both of the directions is located at a position deviating from the tool hole portion. Accordingly, the height of the solar cell panel can be adjusted by moving the holder up and down relatively to the stand in a state in which the holder holds the first frame at one side with respect to the upper standing wall portion.

In construction of the securing structure, insertion of the lateral side extended portion of the securing tool into the slit from the direction orthogonal to the extension direction of the slit in the first frame enables the solar cell panels to be secured to the installation face in turn in one direction. When, for example, the inclined roof face is the installation face, the solar cell panels can be secured in one direction toward the ridge from the eaves. Therefore, all of the solar cell panels to be secured to the installation face can be adjusted in height while being held on the holders by using the securing tools enabling the height adjustment in a state in which the first frames are held on the holders at one sides with respect to the upper standing wall portions.

The holder is moved up and down relatively to the stand by screwing between the external thread on the stand and the internal threads on the holder, thereby continuously adjusting the height. Accordingly, the height of the solar cell panel can be finely adjusted.

The shaft with the external thread is held between the pair of side wall portions of the stand in a state in which the movement thereof in the axial direction is restricted. Examples of a mode thereof can include a mode in which the respective upper ends of the pair of side wall portions are connected by a top surface portion, the respective lower ends thereof are connected by a bottom surface portion, and the shaft is fitted into between the top surface portion and the bottom surface portion. Furthermore, the examples of the mode thereof can include a mode in which upper shelf portions project from the respective upper ends of the pair of side wall portions toward the mating sides, the respective lower ends thereof are connected by the bottom surface portion, and the shaft is fitted into between the upper shelf portions and the bottom surface portion. In these modes, the length of the shaft is substantially equal to the length of the stand. Accordingly, an advantage that the mechanical strength of the stand in the axial direction can be increased with presence of the shaft.

A solar cell panel securing unit according to another aspect of the present invention is "a securing unit for securing a solar cell panel to an installation face, the securing unit including first frames for holding end sides of the solar cell panel and a securing tool for holding the first frames, wherein each of the first frames includes:
a flat plate-like upper abutment portion;
a side surface portion that extends downward from one end of the upper abutment portion;
an installation surface that extends from a halfway height position of the side surface portion in parallel with the upper abutment portion;
a slit that is opened at a halfway height position of the side surface portion below the installation surface and extends in a lengthwise direction of the first frame; and
a lower abutment portion that extends from a lower end of the side surface portion in parallel with the upper abutment portion, the securing tool includes a base member having a flat plate portion, a stand that is erected from the base member, a holder that is moved up and down relatively to the stand, and a shaft on which an external thread is formed on an outer circumferential surface, the stand has a pair of side wall portions and holds the shaft between the side wall portions in a state of restricting movement of the shaft in an axial direction, the shaft is exposed from the stand in a radial direction of the external thread and has a tool engaging portion on an end portion, the holder includes:
a frame support portion that is formed into a planar shape and through which a tool hole portion is formed;
an upper standing wall portion that extends upward at a position deviating from the tool hole portion on the frame support portion;
a lateral side extended portion that is formed by a first extended portion and a second extended portion extending from an upper end of the upper standing wall portion in both of directions orthogonal to the upper standing wall portion;
a pair of lower standing wall portions that extends downward from the frame support portion with the tool hole portion interposed between the lower standing wall portions;
internal threads that are formed on the pair of lower standing wall portions at positions facing each other;
a connecting portion that connects the pair of lower standing wall portions; and
an insertion hole that is formed through the connecting portion, the internal threads are screwed together with the external thread exposed from the stand inserted through the insertion hole, the tool hole portion is located on an extended line of a center axis of the shaft in a state in which the stand has been inserted through the insertion hole, and a hole portion or a space is formed on the extended line between the shaft and the tool hole portion in the stand; and the frame support portion is a portion on which the respective lower abutment portions of the two first frames are installed in a state in which the first extended portion of the securing tool has been inserted into the slit of one of the first frames and the second extended portion of the same securing tool has been inserted into the slit of the other one of the first frames"

The securing unit having this configuration is used for the above-described securing structure. The solar cell panels can be secured to the installation face by securing the base member of the securing tool to roof and holding the solar cell panels by the holder of the securing tool through the first frames. In the securing tool, the holder is moved up and down relatively to the stand, thereby adjusting the height of the solar cell panels.

As described above, the present invention can provide the solar cell panel securing structure, which facilitates the operation of securing the solar cell panels to the installation face with the securing tools and enables fine height adjustment, and the securing unit that is used for the securing structure.

DESCRIPTION OF THE EMBODIMENTS

Figure 1:
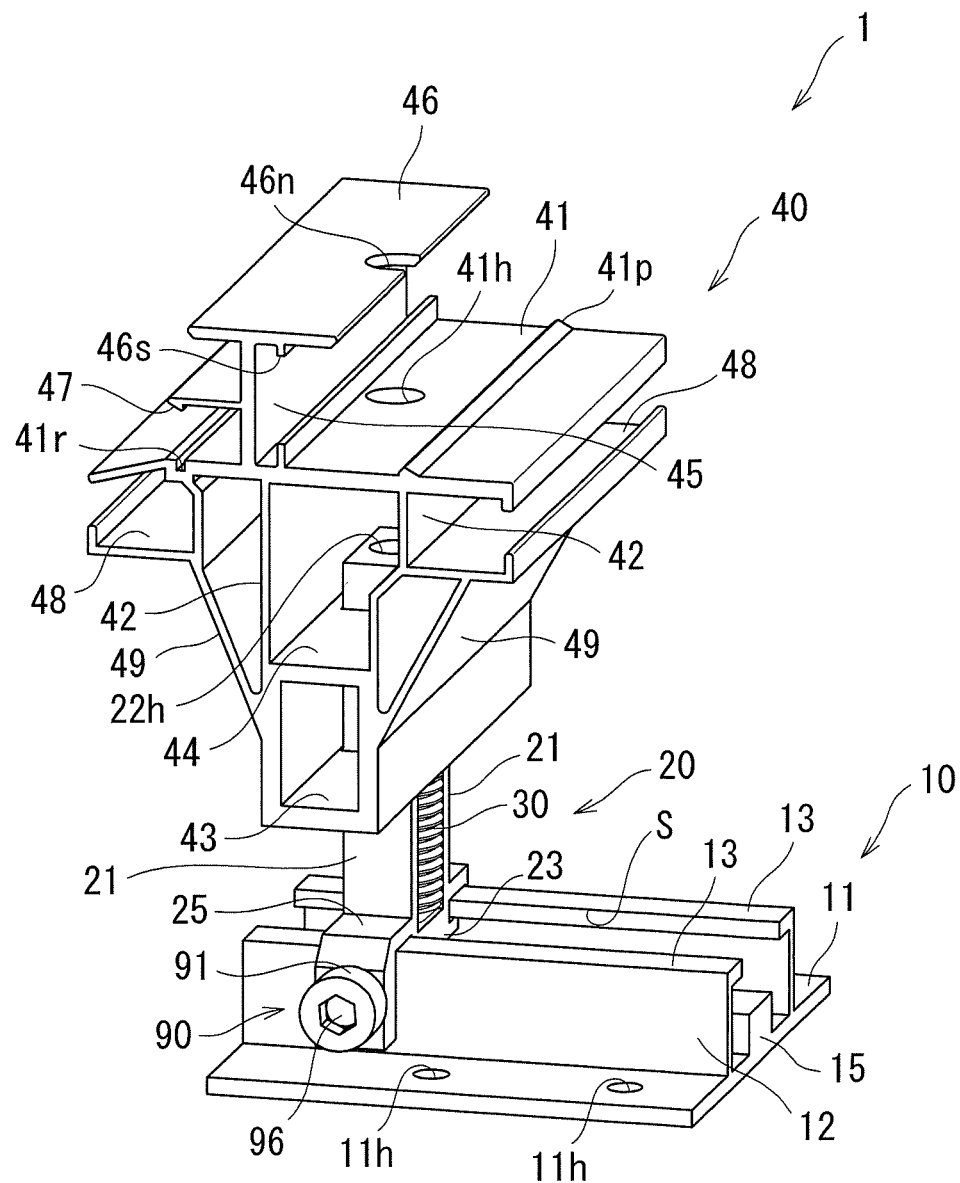
FIG. 1 is a perspective view of a securing tool that is used for a securing structure as a first embodiment of the present invention.
Figure 2:
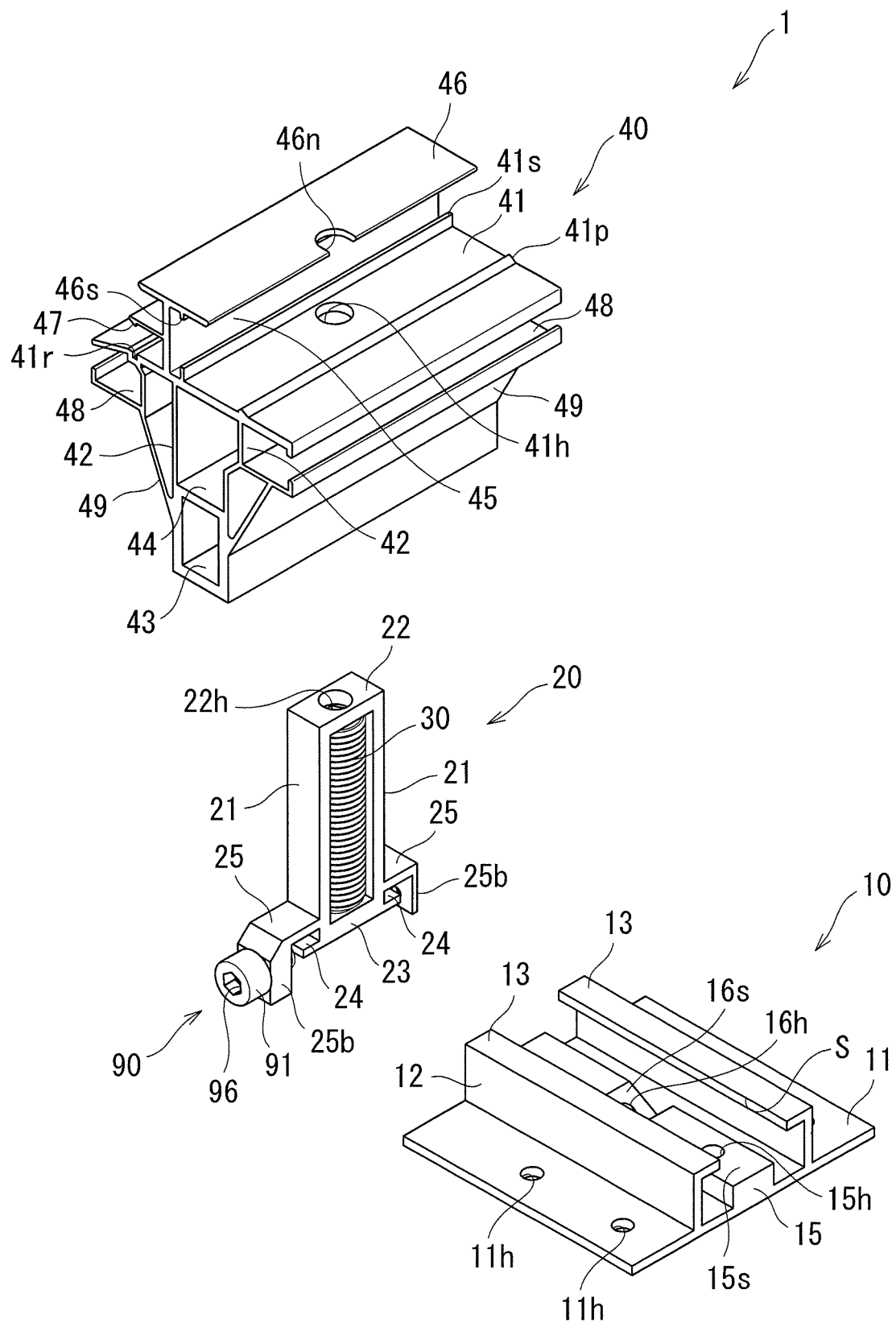
FIG. 2 is an exploded perspective view of the securing tool in FIG. 1.
Figure 3A:
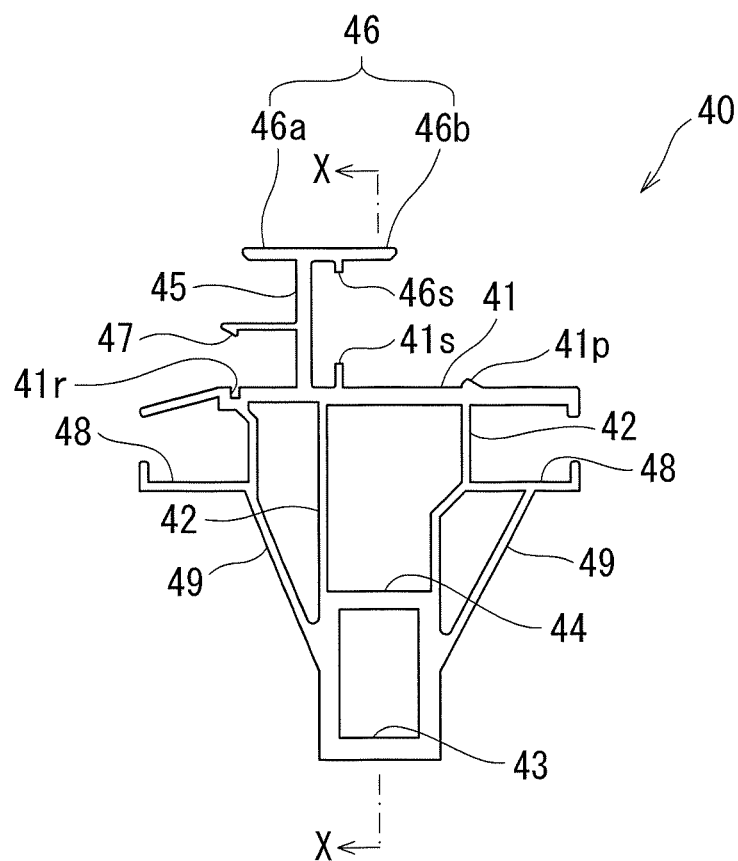
FIG. 3A is a front view of a holder as a component of the securing tool in FIG. 1
Figure 3B:
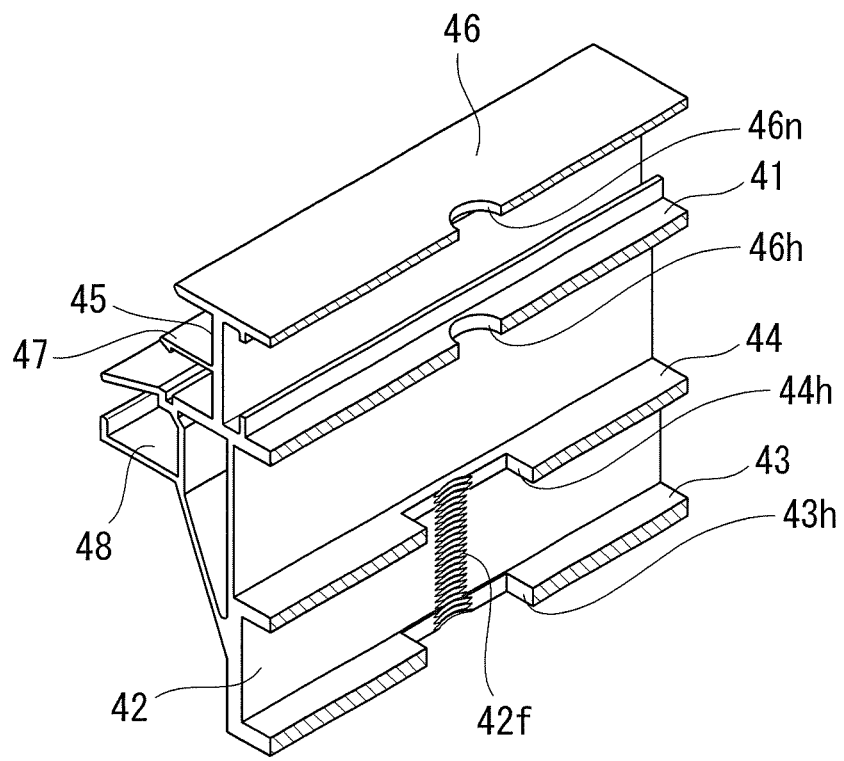
FIG. 3B is a perspective view of the holder cut along line X-X.
Figure 4A:
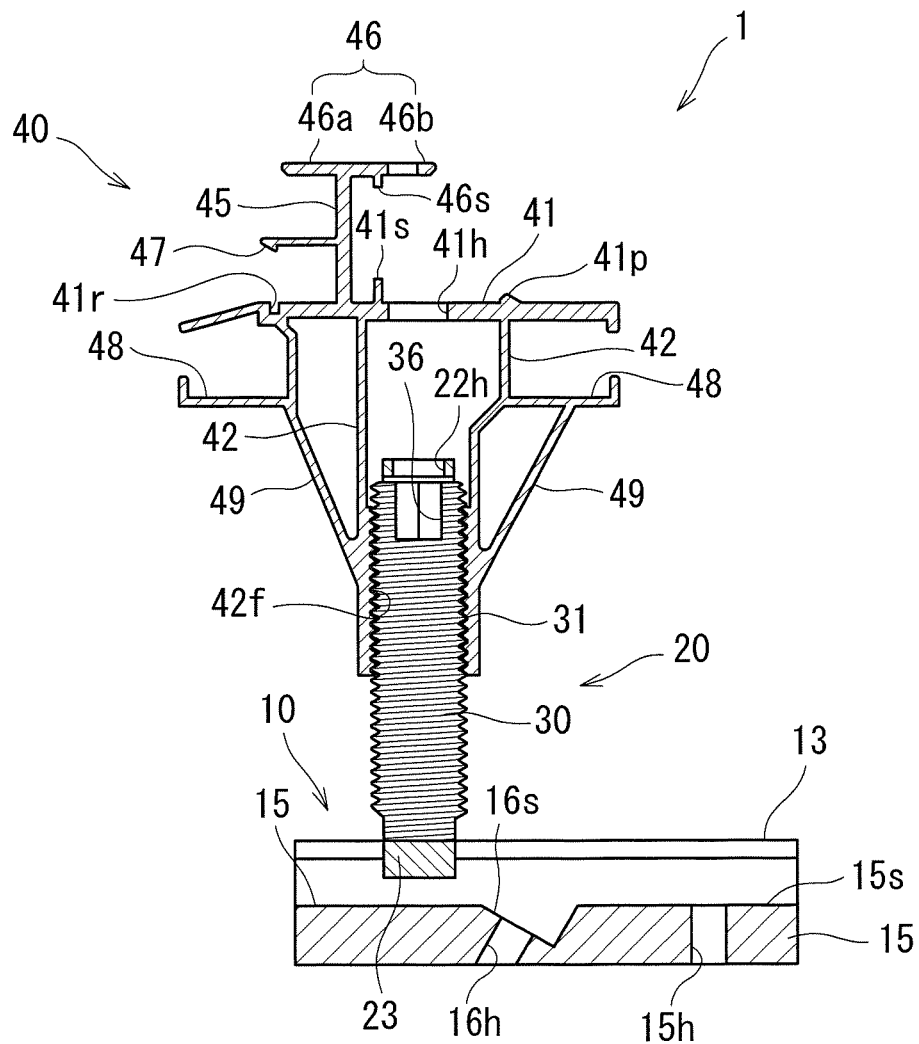
FIG. 4A is a longitudinal cross-sectional view of the securing tool in FIG. 1
Figure 4B:
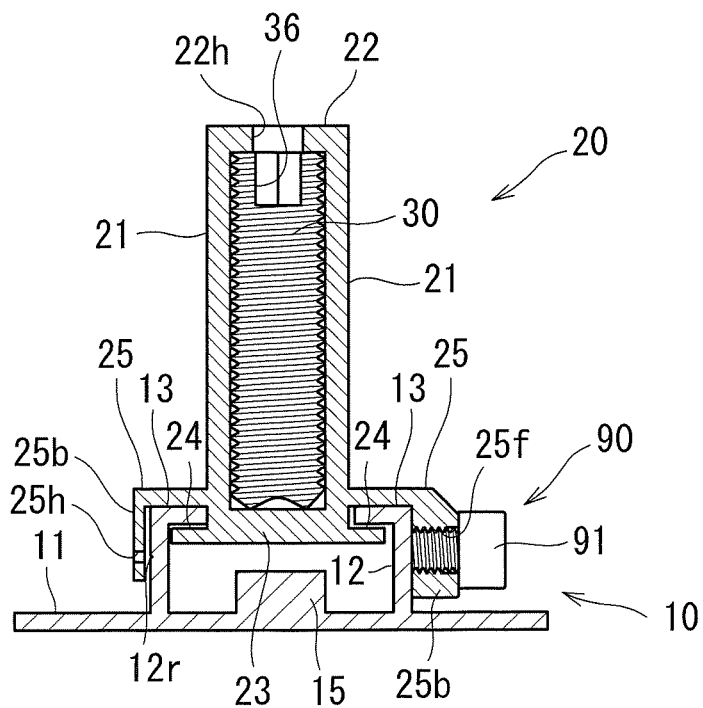
FIG. 4B is a cross-sectional view illustrating a stand and a base member as components of the securing tool in FIG. 1, which is cut along a direction orthogonal to a cutting direction in FIG. 4A.

Hereinafter, a solar cell panel securing structure as a specific embodiment of the present invention and a securing unit that is used for the securing structure will be described with reference to the drawings. The securing structure in the embodiment is a structure in which solar cell panels 60 are secured to an installation face 5 by securing units, and the securing unit includes first frames 61*a* and 61*b* and securing tools 1.

First, the configuration of a frame will be described. The frame holds the peripheral edges of the solar cell panel 60 and is formed by the pair of first frames 61*a* and 61*b* holding a pair of end sides of the solar cell panel 60 having a square shape when seen from above and a pair of second frames (not illustrated) holding the other pair of end sides. The cross-sectional shapes of the pair of first frames 61a and 61b, which are orthogonal to the lengthwise direction, are symmetrical to each other with respect to the solar cell panel 60. The first frames 61a and 61b are extruded members made of metal such as aluminum and the cross-sectional shapes thereof, which are orthogonal to the lengthwise direction, are constant.

Figure 6A:
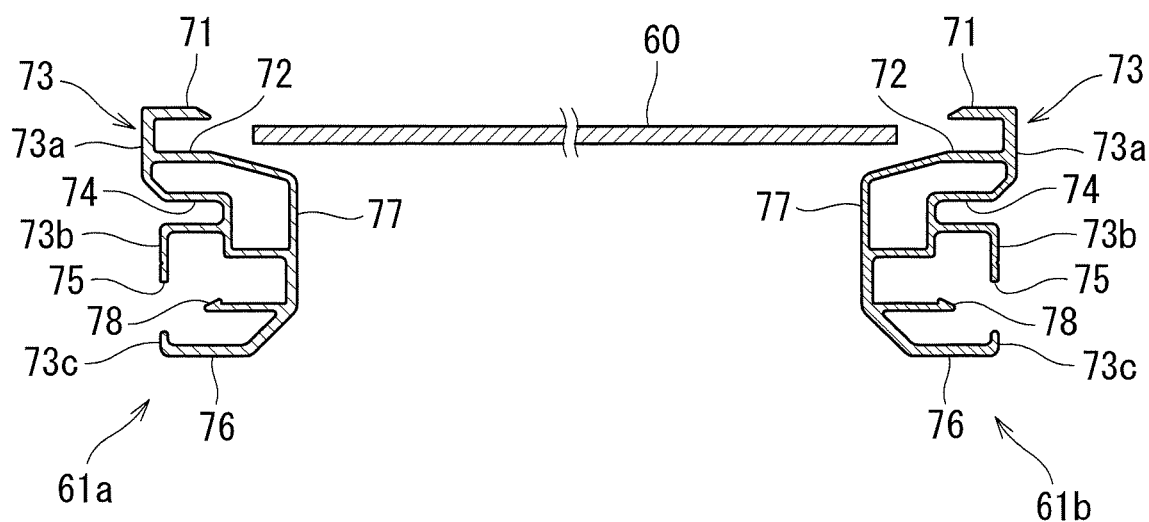
FIG. 6A is a cross-sectional view illustrating first frames configuring, together with the securing tools in FIG. 1, a securing unit and the solar cell panel

As illustrated in FIG. 6A, each of the first frames 61a and 61b includes a flat plate-like upper abutment portion 71 that is made to abut against the upper surface of the solar cell panel 60, a side surface portion 73 that extends downward perpendicularly from one end of the upper abutment portion 71, an installation surface 72 that extends from a halfway height position of the side surface portion 73 in parallel with the upper abutment portion 71 and holds the solar cell panel 60 between the installation surface 72 and the upper abutment portion 71 in a state in which the solar cell panel 60 is installed on the installation surface 72, a slit 74 that is opened at a halfway height position of the side surface portion 73 at the lower side relative to the installation surface 72 and extends in the lengthwise direction of the first frame 61a or 61b, a lower abutment portion 76 that extends from the lower end of the side surface portion 73 in parallel with the upper abutment portion 71, and a connecting wall 77 that connects the lower abutment portion 76 and the installation surface 72 at the inner side relative to the side surface portion 73. Furthermore, each of the first frames 61a and 61b includes a first engaging piece 78 that projects outward from the connecting wall 77 at a lower position relative to the slit 74 and the front end of the first engaging piece 78 is formed into a hook-like shape bent upward. A gap 75 permitting access to the first engaging piece 78 from the outer side is formed in the side surface portions 73 at a position with substantially the same height as the first engaging piece 78.

The "inner side" and the "outer side" are the "inner side" and the "outer side" relative to a space surrounded by the pair of first frames 61a and 61b and the pair of second frames in a state in which these frames hold the peripheral edges of the solar cell panel 60.

A portion of the side surface portion 73 at the upper side relative to the slit 74 is referred to as a side surface upper portion 73a, a portion thereof between the slit 74 and the gap 75 is referred to as a side surface intermediate portion 73b, and a portion thereof at the lower side relative to the gap 75 is referred to as a side surface lower portion 73c. Although in the embodiment, the side surface intermediate portion 73b is in parallel with the side surface upper portion 73a, they are not formed on the same plane and the side surface intermediate portion 73b is located at the inner side relative to the side surface upper portion 73a. On the other hand, the side surface lower portion 73c is formed on the same plane as the side surface intermediate portion 73b. The connecting wall 77 is mainly formed by a portion in parallel with the side surface portion 73, an upper portion thereof is inclined outward toward the upper side and reaches the installation surface 72, and a lower portion thereof is inclined outward toward the lower side and reaches the lower abutment portion 76.

The cross-sectional shapes of the pair of second frames, which are orthogonal to the lengthwise direction, are symmetrical to each other with respect to the solar cell panel 60. The pair of second frames can have the same configuration as that of the pair of first frames 61a and 61b. With this configuration, the number of types of the frames can be reduced and the pair of second frames can be secured to the installation face 5 with the securing tools 1. When the solar cell panel 60 is secured to the installation face 5 with the securing tools 1 through the first frames 61a and 61b and the second frames, the second frames are also components of the securing unit.

Alternatively, the second frames can be configured on the assumption that no securing tool is attached thereto. In this case, the second frames are not the components of the securing unit. The second frames in this case include upper abutment portions, installation surfaces, side surface portions, lower abutment portions, and connecting portions that are similar to those of the first frames 61a and 61b. The second frames are however configured such that no slit is opened in the side surface portions, no first engaging piece projects from the connecting portions, and no configuration corresponding to the gaps 75 of the first frames 61a and 61b is provided, unlike the first frames 61a and 61b. The second frames are extruded members made of metal such as aluminum and the cross-sectional shapes thereof, which are orthogonal to the lengthwise direction, are constant.

As illustrated in FIG. 1 to FIG. 4B, the securing tool 1 includes a base member 10 that is secured to the installation face 5, a stand 20 that is made to stand on the base member 10, a shaft 30 that is held in the stand 20, and a holder 40 that is supported on the stand 20 through the shaft 30.

The base member 10 includes a flat plate-like flat plate portion 11, a pair of base walls 12 erected from the flat plate portion 11, and a pair of lip pieces 13 extending inward from the upper end sides of the pair of base walls 12. The base walls 12 form right angles with respect to the flat plate portion 11 and the lip pieces 13 form right angles with respect to the base walls 12. Accordingly, the pair of lip pieces 13 is in parallel with the flat plate portion 11. The pair of lip pieces 13 is separated from each other and a space therebetween forms a base slit S. A plurality of hole portions 11h are formed through the flat plate portion 11 at the outer sides of the pair of base walls 12.

A protrusion 15 having a long rectangular bar shape projects upward from the flat plate portion 11 just under the base slit S between the pair of base walls 12 so as to be in parallel with the base walls 12. Most of the upper surface of the protrusion 15 is formed as a parallel surface 15s in parallel with the flat plate portion 11 whereas a part thereof is formed as an inclined surface 16s inclined with respect to the flat plate portion 11. A position of the inclined surface 16s is the substantially center of the protrusion 15 in the lengthwise direction. A hole portion 15h orthogonal to the parallel surface 15s and a hole portion 16h orthogonal to the inclined surface 16s are formed through the protrusion 15.

The stand 20 includes a pair of side wall portions 21, a top surface portion 22 connecting the upper ends of the pair of side wall portions 21, and a bottom surface portion 23 connecting the lower ends of the pair of side wall portions 21. Guiding pieces 24 with the same height respectively extend outward beyond the pair of side wall portions 21 from the bottom surface portion 23. A pair of flanges 25 respectively project from the pair of side wall portions 21 at the upper side relative to the guiding pieces 24 so as to be in parallel with the guiding pieces 24. In the embodiment, the flanges 25 project so as to be longer than the guiding pieces 24 and bent pieces 25b extend downward perpendicularly from end portions of the flanges 25 toward the bottom surface portion 23. A distance between the guiding piece 24 and the flange 25 located at the same side is slightly larger than the thickness of the lip piece 13 of the base member 10 and a distance between the bent piece 25b and the side wall portion 21 is slightly larger than the width of the lip piece 13.

A thread hole 25f is formed through one of the bent pieces 25b and a bolt 90 penetrates through the thread hole 25f. The bolt 90 has a tool engaging portion 96 which is engaged with a tool on a head 91 thereof. The tool engaging portion 96 is a hexagonal recess portion which is engaged with a hexagonal wrench as the tool. A small hole 25h is formed through the other one of the bent pieces 25b.

In the stand 20, the pair of side wall portions 21, the top surface portion 22, and the bottom surface portion 23 form a longitudinal frame body and the shaft 30 is held therein. The shaft 30 has a length that is substantially equal to a distance between the top surface portion 22 and the bottom surface portion 23 and is just fitted into the longitudinal frame body. An external thread 31 is formed on the outer circumferential surface of the shaft 30 over the entire length. A commercially available "headless bolt" can be used as the shaft 30. The length of the external thread 31 in the radial direction is larger than the width of the side wall portions 21. Accordingly, the external thread 31 of the shaft 30 held in the stand 20 is exposed outward from the stand 20 in the radial direction.

The shaft 30 has a tool engaging portion 36 which is engaged with a tool on the upper end thereof, that is, an end portion thereof at the top surface portion 22 side. The tool engaging portion 36 is a hexagonal recess portion which is engaged with a hexagonal wrench as the tool. A tool hole portion 22h is formed through the top surface portion 22 of the stand 20 so as to be located on an extended line of the center axis of the shaft 30.

The holder 40 includes a flat plate-like frame support portion 41 having an oblong shape when seen from above, an upper standing wall portion 45 that extends upward from the frame support portion 41, a lateral side extended portion 46 that is formed by a first extended portion 46a and a second extended portion 46b extending from the upper end of the upper standing wall portion 45 in both of directions orthogonal to the upper standing wall portion 45, and a projection 41p that projects from the frame support portion 41 at a position separated from the upper standing wall portion 45 in the same direction as the extension direction of the second extended portion 46b. The upper standing wall portion 45 is in parallel with a pair of long sides of the frame support portion 41 and a distance from one of the pair of long sides to the upper standing wall portion 45 is larger than a distance from the other one of the pair of long sides to the upper standing wall portion 45. In other words, the upper standing wall portion 45 is located so as to deviate in the direction orthogonal to the lengthwise direction relatively to the frame support portion 41.

The first extended portion 46a and the second extended portion 46b have the same height from the frame support portion 41 and form a T-shaped cross section together with the upper standing wall portion 45. One of the first extended portion 46a and the second extended portion 46b, which extends toward one of the pair of long sides of the frame support portion 41 with a smaller distance from the upper standing wall portion 45, is referred to as the first extended portion 46a.

The projection 41p is a protrusion in parallel with the upper standing wall portion 45 and has the height of 1 mm to 5 mm from the frame support portion 41.

The securing tool 1 further includes a second engaging piece 47 projecting from the upper standing wall portion 45 in the same direction as the extension direction of the first extended portion 46a at the lower side relative to the first extended portion 46a and the front end of the second engaging piece 47 is formed into a hook-like shape bent downward. In addition, the securing tool 1 includes an upper projecting wall 46s that projects short downward from the second extended portion 46b at a position separated from the upper standing wall portion 45 by several millimeters and a lower projecting wall 41s that projects short upward from the frame support portion 41 at a position just under the upper projecting wall 46s. The upper projecting wall 46s and the lower projecting wall 41s are surfaces in parallel with the upper standing wall portion 45. A distance from the upper standing wall portion 45 to the upper projecting wall 46s is set to be larger than the double of a distance between an extended surface of the side wall upper portion 73a and the side wall intermediate portion 73b in each of the first frames 61a and 61b by 2 mm to 5 mm.

Furthermore, the holder 40 includes a pair of lower standing wall portions 42 that respectively extends downward from the frame support portion 41 perpendicularly to the frame support portion 41 and extends in the lengthwise direction of the frame support portion 41, a connecting portion 43 that connects the lower ends of the lower standing wall portions 42, and a second connecting portion 44 that connects the pair of lower standing wall portions 42 at the upper side relative to the connecting portion 43. The pair of lower standing wall portions 42 is located at the substantially center of the frame support portion 41 in the direction orthogonal to the lengthwise direction. Although in this example, the case in which one of the pair of lower standing wall portions 42 extends from the frame support portion 41 perpendicularly, and then, is obliquely bent, and extends perpendicularly to the frame support portion 41 again is illustrated, the bent portion is not essential.

An insertion hole 43h and a second insertion hole 44h into which the pair of side wall portions 21 of the stand 20 is inserted are respectively formed through the connecting portion 43 and the second connecting portion 44 of the holder 40. The insertion hole 43h and the second insertion hole 44h are respectively located at the centers of the connecting portion 43 and the second connecting portion 44, and the centers of the respective holes are located on the same line. The stand 20 is inserted into the insertion hole 43h and the second insertion hole 44h in a state in which the exposed portions of the external thread 31 of the shaft 30 are made to face the pair of lower standing wall portions 42. Internal threads 42f are respectively formed on the pair of lower standing wall portions 42. The internal threads 42f are formed so as to be screwed together with the external thread 31 exposed from the stand 20 in a state in which the stand 20 has been inserted through the insertion hole 43h and the second insertion hole 44h.

Furthermore, a tool hole portion 41h having a circular shape is formed through the frame support portion 41 of the holder 40. The tool hole portion 41h is located between the pair of lower standing wall portions 42. The tool hole portion 41h is located on an extended line of the center axis of the shaft 30 in a state in which the external thread 31 has been screwed together with the internal threads 42f. Accordingly, a tool inserted through the tool hole portion 41h of the holder 40 and the tool hole portion 22h of the stand 20 can be engaged with the tool engaging portion 36 of the shaft 30. It should be noted that in the holder 40 in the embodiment, the second extended portion 46b projects over and covers the tool hole portion 41h partially. Therefore, a tool cutout 46n is formed in the second extended portion 46b at a position just above the tool hole portion 41h. The presence of the tool cutout 46n prevents the second extended portion 46b from being as an obstacle when the tool is inserted through the tool hole portion 41h. When the second extended portion 46b projects so as to entirely cover the tool hole portion 41h, a tool hole portion may be formed through the second extended portion 46b instead of the tool cutout 46n.

The holder 40 includes flat plate-like holding portions 48 extending substantially in parallel with the frame support portion 41 under the frame support portion 41. The holding portions 48 are portions for holding wire materials such as electric wires for supplying electricity to the solar cell panels 60. The holding portions 48 can be made to extend from the lower standing wall portions 42 or extend from ribs 49 connecting the lower standing wall portions 42 and the frame support portion 41 in order to reinforce the mechanical strength of the holder 40. In this example, the holder 40 includes the pair of holding portions 48, and one of them extends from the lower standing wall portion 42 whereas the other one of them extends from the rib 49.

In addition, the holder 40 has a long groove 41r in parallel with the upper standing wall portion 45 so as to be separated from the upper standing wall portion 45 at the opposite side to the lower projecting wall 41s on the frame support portion 41. Although the case in which the frame support portion 41 is slightly bent downward at an end portion side relative to the long groove 41r is illustrated, such the bent portion may not be provided.

Each of the base member 10, the stand 20, and the holder 40 can be easily manufactured by forming a member having a constant cross section orthogonal to an extrusion direction by extrusion molding of a metal material such as aluminum, and then, performing processing of forming the hole portions and/or the internal threads therein.

The tool engaging portion 36 of the shaft 30 and the tool engaging portion 96 of the bolt 90 are the hexagonal recess portions having the same size and the shaft 30 and the bolt 90 can be rotated using a common tool.

When the securing tool 1 having the above-described configuration is assembled, first, the stand 20 is inserted through the insertion hole 43h and the second insertion hole 44h from below the holder 40 and the portions of the external thread 31 of the shaft 30, which are exposed from the stand 20, are screwed together with the internal threads 42f. The holder 40 and the stand 20 are thus integrated with each other.

When the stand 20 is mounted on the base member 10, the stand 20 is inserted into the base slit S through an opening at the lateral side. In this case, the flanges 25 are located over the lip pieces 13 and the guiding pieces 24 are located under the lip pieces 13. In this state, the stand 20 is made to slide along the base slit S, so that the position of the securing tool 1 on the installation face 5 can be adjusted.

After the position of the stand 20 relative to the base member 10 is adjusted, the pair of flanges 25 is installed on the lip pieces 13, and the bolt 90 inserted through the thread hole 25f of the bent piece 25b is advanced to press the front end of the bolt 90 against the base wall 12 in a state in which the bent piece 25b having no thread hole 25f is made to abut against the base wall 12. The stand 20 is thereby secured to the base member 10 with friction force between the bolt 90 and the base wall 12. The stand 20 installed on the lip pieces 13 stands perpendicularly to the flat plate portion 11 because the flat plate portion 11 and the lip pieces 13 are in parallel with each other. The small hole 25h is formed through the bent piece 25b having no thread hole 25f and a screw inserted therethrough is fastened to the base wall 12, so that the stand 20 can be firmly secured to the base wall 10. A long groove 12r for positioning the screw is formed in the outer surface of one base wall 12 for the above-described securing (see FIG. 4B).

Figure 5A:
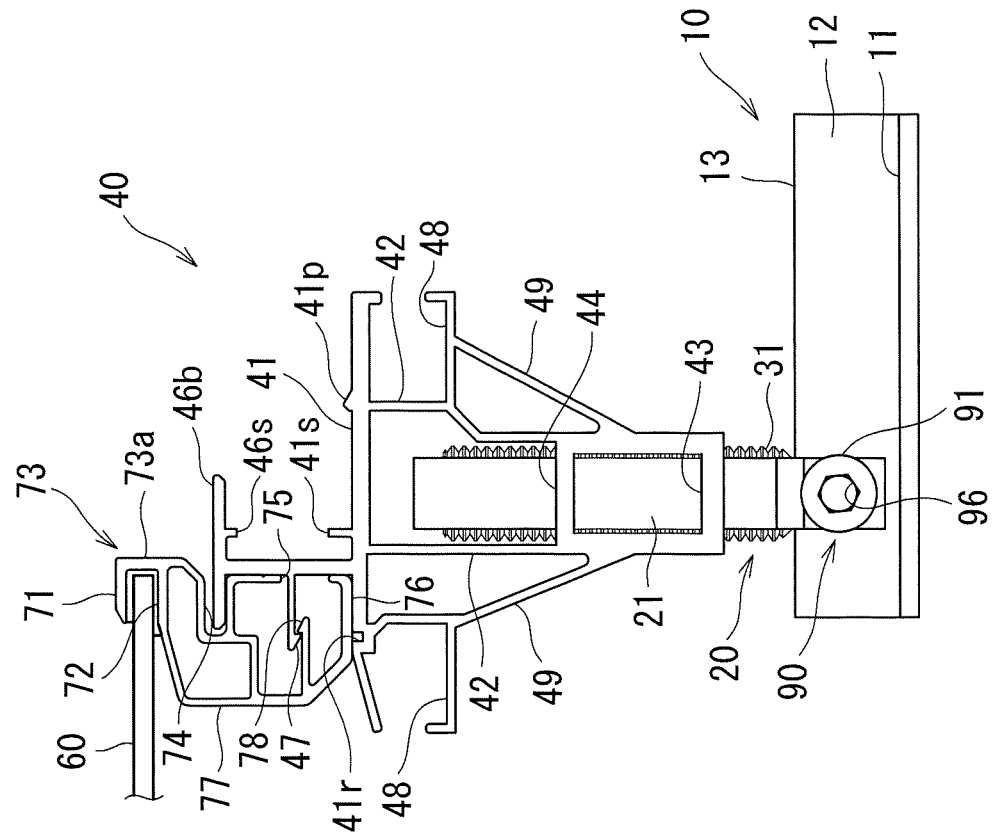
FIG. 5A and FIG. 5B are views for explaining height adjustment of a solar cell panel with the securing tool in FIG. 1.
Figure 5B:
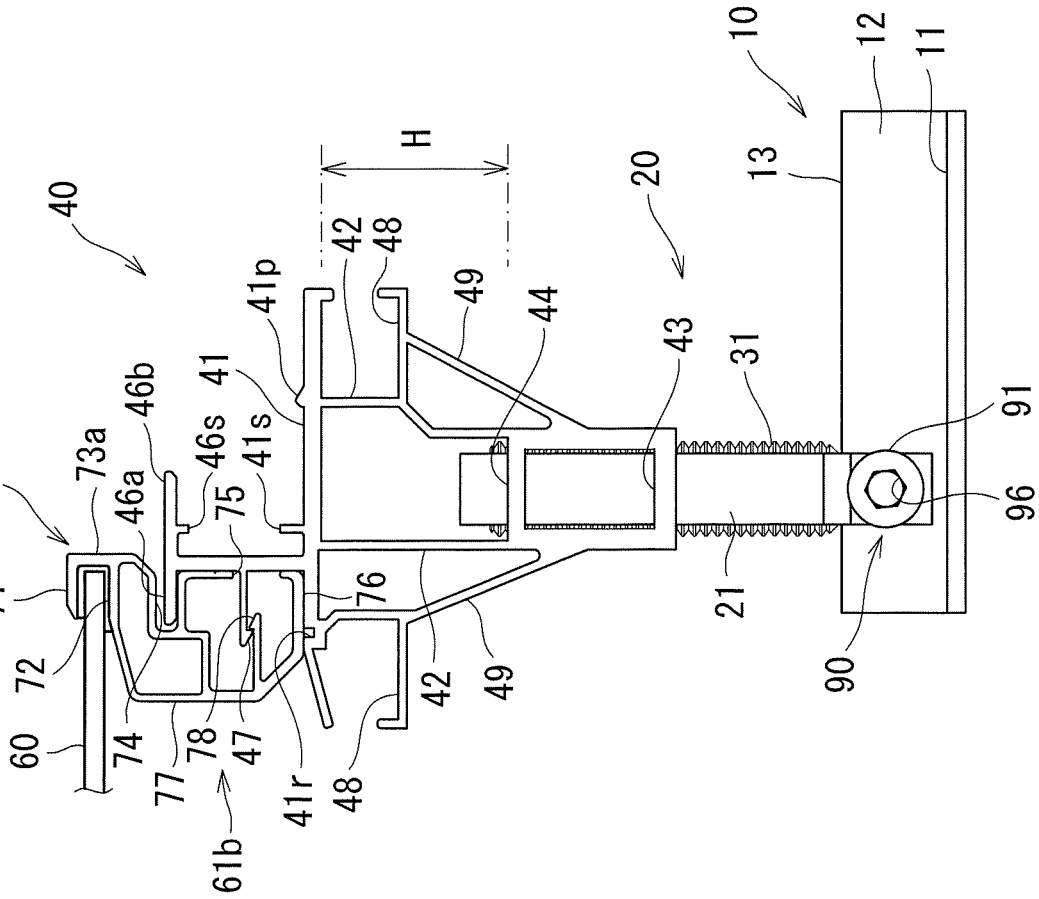

Next, height adjustment of the solar cell panel 60 with the securing tool 1 will be described with reference to FIG. 5A and FIG. 5B mainly. The height adjustment can be performed in a state in which one of the pair of first frames 61a and 61b holding the end sides of the solar cell panel 60 is held at the first extended portion 46a side of the holder 40. This will be described later.

To move up and down the holder 40 in relative to the stand 20, the tool inserted through the tool hole portion 41h of the holder 40 and the tool hole portion 22h of the stand 20 is engaged with the tool engaging portion 36 of the shaft 30 and the shaft 30 is rotated. The stand 20 inhibits the movement of the shaft 30 in the axial direction. Therefore, the holder 40 having the internal threads 42f that are screwed together with the external thread 31 of the shaft 30 is moved up and down with the rotation of the shaft 30.

Under the assumption that the internal threads 42f of the entire length between the connecting portion 43 and the second connecting portion 44 are screwed together with the external thread 31 all the time in order to stably support the holder 40 by the stand 20, the holder 40 is moved up and down relatively to the stand 20 in a height range (H in FIG. 5A) until the top surface portion 22 as the upper end of the stand 20 abuts against the frame support portion 41 to adjust the height of the solar cell panel 60.

In the embodiment, a distance between the connecting portion 43 and the second connecting portion 44 is made substantially equal to the distance H as the height adjustment range. Furthermore, only portions of the pair of lower standing wall portions 42, which are lower than the second connecting portion 44, are made thick and the internal threads 42f are formed in the lower portions. This configuration is intended to make the lengths of the internal threads 42f as short as possible while ensuring stable support of the holder 40 by the stand 20. This configuration provides such advantage that the holder 40 can be reduced in weight by limiting the portions of the lower standing wall portions 42, which are made thick for forming the internal threads. By contrast, the internal threads 42f may be formed on the entire lengths of the pair of lower standing wall portions 42 in the height direction. This case provides such advantage that the holder 40 is supported by the stand 20 more stably. When the internal threads 42f are formed on the entire lengths of the lower standing wall portions 42, the second connecting portion 44 may not be provided.

Hereinafter, construction of the securing structure in which the solar cell panels 60 are secured to the installation face 5 through the securing tools 1 will be described with reference to FIG. 7A to FIG. 9C mainly. In this example, the inclined roof surface is the installation face 5 and the plurality of solar cell panels 60 are secured through the plurality of securing tools 1 in a plurality of rows in the inclination direction of the installation face 5. The lower end of the inclined roof face corresponds to the "eaves" and the upper end thereof corresponds to the "ridge". It is assumed that the peripheral edges of the solar cell panels 60 are previously held by the first frames 61a and 61b and the second frames. Ones of the first frames 61a and 61b, which hold the end sides of the solar cell panels 60 at the eaves side, are referred to as the first frames 61a whereas the others thereof, which hold the end sides of the solar cell panels 60 at the ridge side, are referred to as the first frames 61b for distinguishing. It should be noted that an arrow F in the drawings indicates the downward direction of the installation face 5.

Figure 6B:
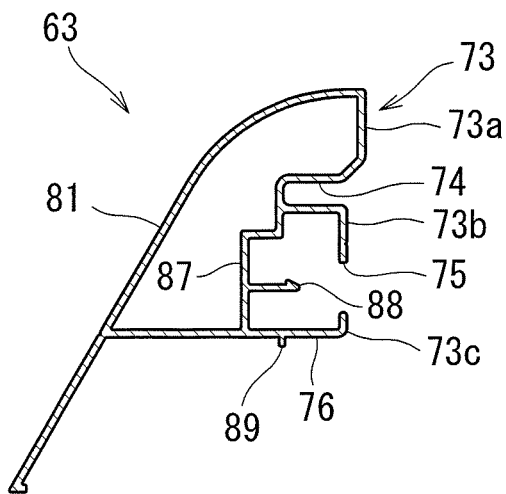
FIG. 6B is a cross-sectional view of a decorative cover.

Decorative covers 63 can be mounted on the eaves-side end sides of the solar cell panels 60 belonging to a row at the most eaves side. A part of the cross-sectional shape of each decorative cover 63 in the direction orthogonal to the lengthwise direction is common to those of the first frames 61a and 61b, as illustrated in FIG. 6B. Common portions are the side surface portion 73 (the side surface upper portion 73a, the side surface intermediate portion 73b, and the side surface lower portion 73c), the slit 74, the gap 75, and the lower abutment portion 76. Each decorative cover 63 includes a cover portion 81 extending from the upper end of the side surface portion 73 so as to have the same height as that of the upper abutment portion 71 of each of the first frames 61a and 61b and the cross section of the cover portion 81 has a curved shape that is lowered as is farther from the side surface portion 73. A connecting wall 87 connects an inner wall of the slit 74 and the lower abutment portion 76 and the lower abutment portion 76 reaches the cover portion 81 beyond a connection portion thereof. A first engaging piece 88 having the same configuration as that of the first engaging piece 78 of each of the first frames 61a and 61b projects from the connecting wall 87. A protrusion 89 projecting downward from the lower abutment portion 76 is formed over the entire length of the decorative cover 63 in the lengthwise direction. The decorative cover 63 is an extruded member made of metal such as aluminum and the cross-sectional shape thereof, which is orthogonal to the lengthwise direction, is constant as in the first frames 61a and 61b and the second frames.

When the decorative cover 63 as described above is mounted on the securing tool 1, the holder 40 and the decorative cover 63 are made to relatively slide from end portions in the lengthwise direction such that the first extended portion 46a of the holder 40 is inserted into the slit 74 of the decorative cover 63 and the protrusion 89 of the decorative cover 63 is inserted into the long groove 41r of the holder 40. With this sliding, the hook-like front end of the first engaging piece 88 of the decorative cover 63 and the hook-like front end of the second engaging piece 47 of the holder 40 are engaged with each other.

External force in the direction of separating the decorative cover 63 from the securing tool 1 acts on the decorative cover 63 by its own weight because the installation face 5 is inclined. As for this point, the protrusion 89 is locked by the long groove 41r of the securing tool 1, so that the decorative cover 63 is supported by the securing tool 1 more stably in comparison with the case in which only the engagement between the first engaging piece 88 and the second engaging piece 47 acts against the external force.

Figure 7A:
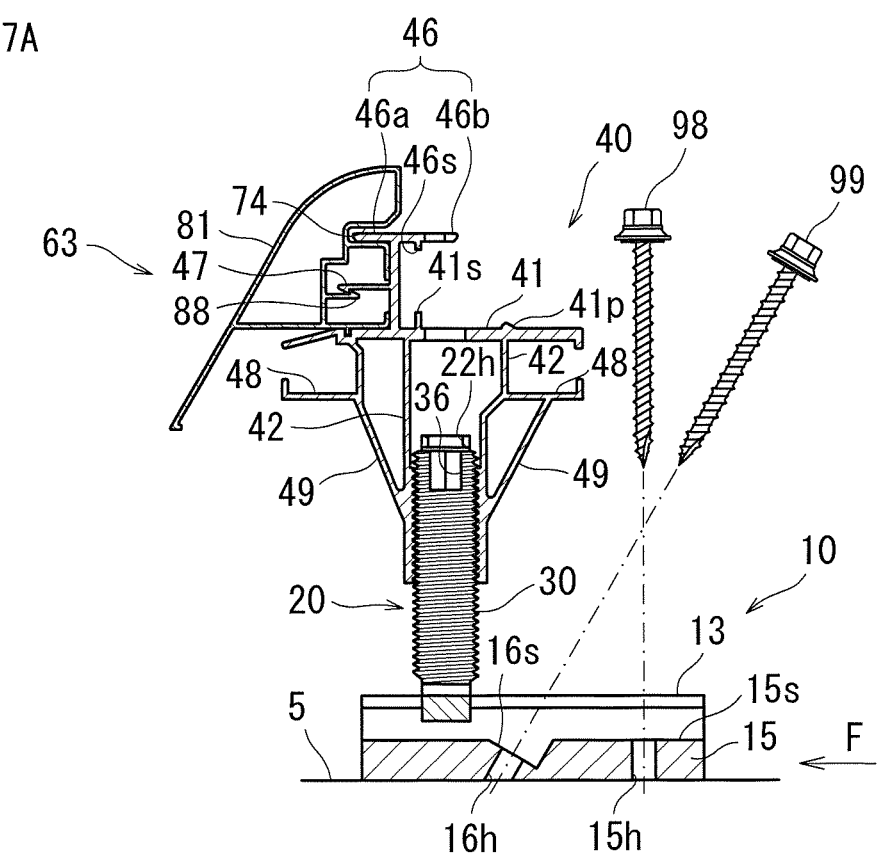
FIG. 7A and FIG. 7B are descriptive views for explaining procedures of securing the solar cell panels to an installation face using the securing tools in FIG. 1.
Figure 7B:
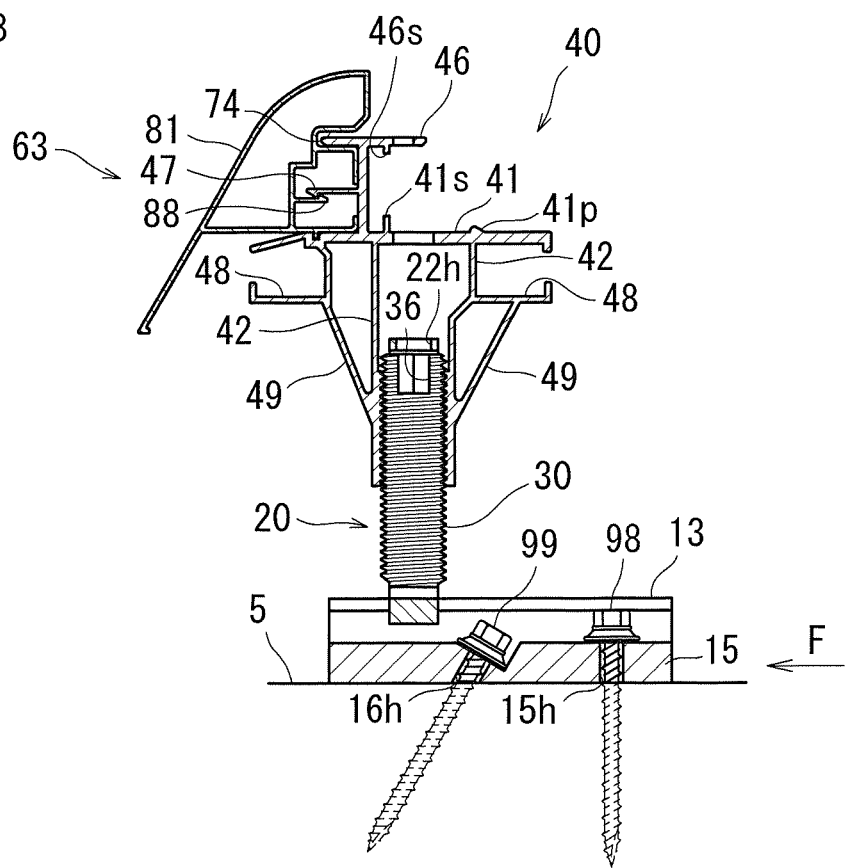

After the decorative cover 63 is mounted, the securing tool 1 is placed on the installation face 5 (see FIG. 7A). Then, the orientation of the securing tool 1 is set such that the extension direction of the protrusion 15 of the base member 10 is identical to the inclination direction of the installation face 5 and the inclined surface 16s faces the ridge side. Furthermore, standing position of the stand 20 on the base member 10 is set to be located at the eaves side relative to the inclined surface 16s. The securing tool 1 is secured to the installation face 5 with the screws inserted through the hole portions 11h, 15h, and 16h of the securing tool 1. A screw 98 inserted through the hole portion 15h is fastened perpendicularly to the installation face 5 in the same manner as the screws (not illustrated) inserted through the hole portions 11h whereas a screw 99 inserted through the hole portion 16h provided in the inclined surface 16s is fastened obliquely to the installation face 5. The screw 99 is screwed into the installation face 5 to be under the stand 20 located at the eaves side relative to the inclined surface 16s because the inclined surface 16s faces the ridge side (see FIG. 7B).

After the securing tool 1 is secured to the installation face 5, the height of the decorative cover 63 is adjusted by moving the holder 40 up and down relatively to the stand 20 by the above-described method if necessary. When the securing tool 1 is secured to the installation face 5, a waterproofing material (not illustrated) is interposed between the flat plate portion 11 of the securing tool 1 and the installation face 5.

Figure 8A:
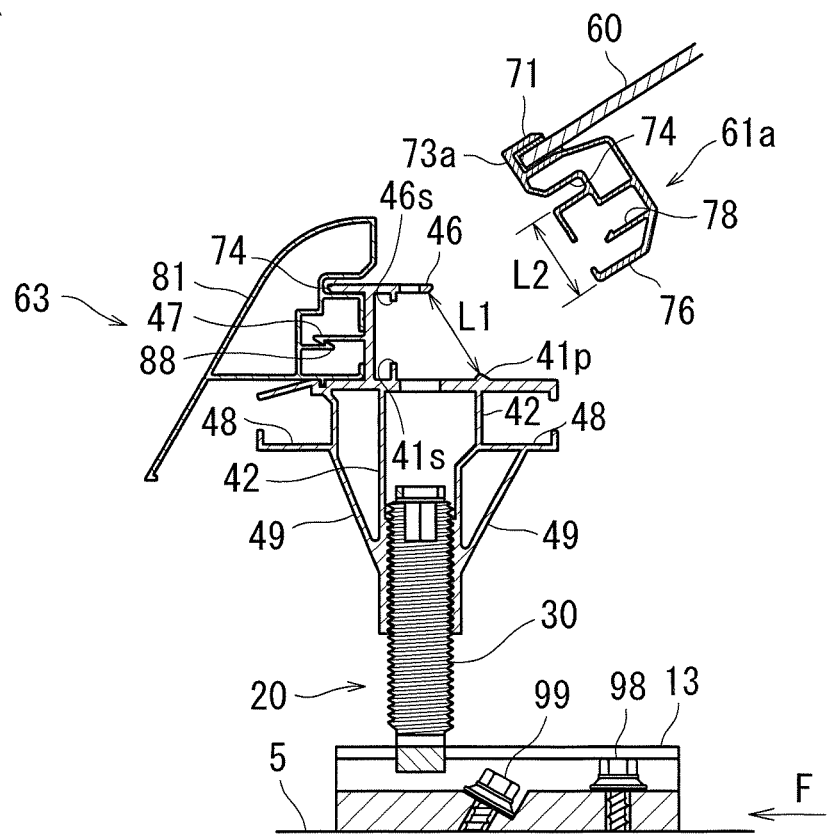
FIG. 8A and FIG. 8B are descriptive views for explaining the procedures of securing the solar cell panels to the installation face using the securing tools in FIG. 1 subsequently to FIG. 7B.
Figure 8B:
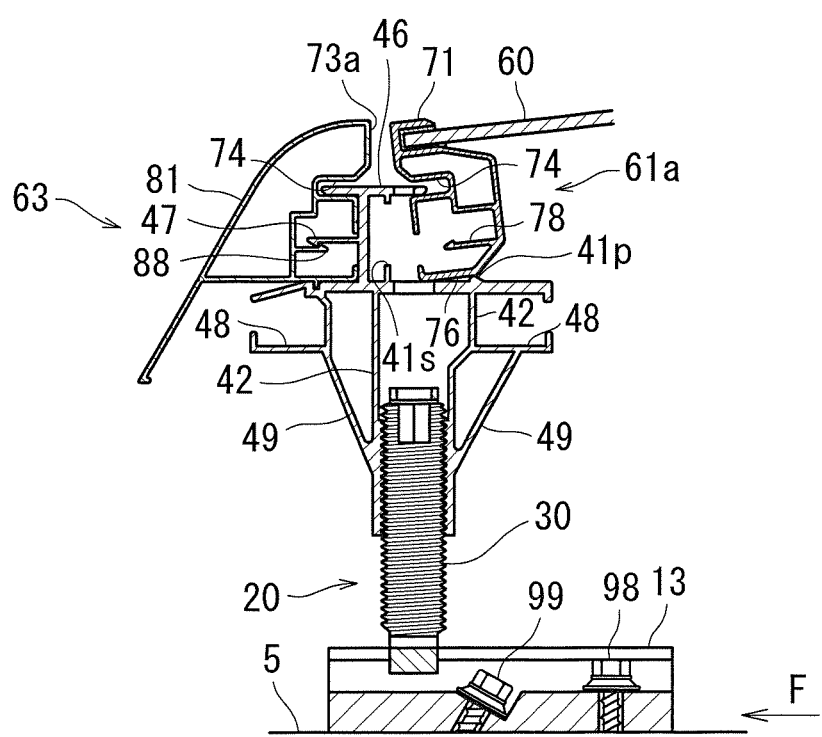

After the decorative cover 63 is secured with the securing tool 1, the solar cell panel 60 is supported at the ridge side of the same securing tool 1 fixing the decorative cover 63. To be specific, the lower abutment portion 76 of the eaves-side first frame 61a of the pairs of first frames 61a and 61b holding the peripheral edges of the solar cell panel 60 is installed on the frame support portion 41 of the securing tool 1 while inserting the second extended portion 46b of the securing tool 1 into the slit 74 of the first frame 61a. Although the projection 41p projects from the frame support portion 41 of the securing tool 1 at the same side as the second extended portion 46b, as illustrated in FIG. 8A, a distance L1 between the projection 41p and an end portion of the second extended portion 46b is set to be larger than a distance L2 between the lower end of opening edge of the slit 74 and the lower abutment portion 76 in the first frame 61a. Therefore, the second extended portion 46b can be inserted into the slit 74 by inclining the solar cell panel 60 so as to be higher toward the ridge (see FIG. 8B).

Figure 9A:
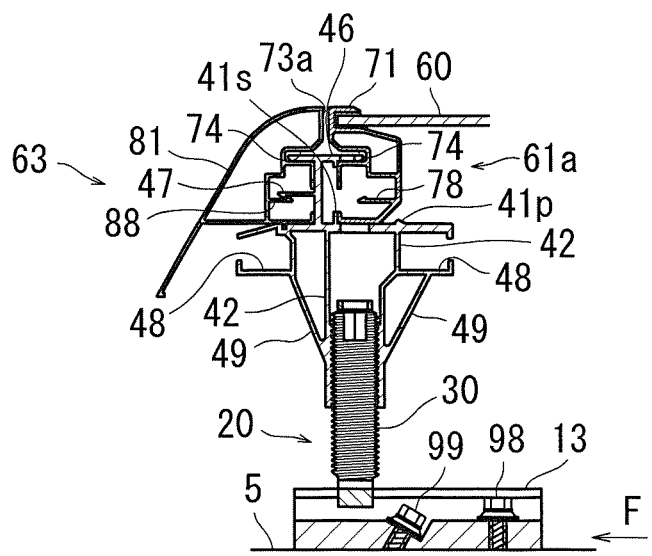
FIG. 9A to FIG. 9C are descriptive views for explaining the procedures of securing the solar cell panels to the installation face using the securing tools in FIG. 1 subsequently to FIG. 8B.

The portion of the first frame 61a at the lower side relative to the lower end of the opening of the slit 74 is located in a space below the second extended portion 46b and the entire surface of the lower abutment portion 76 can be made to abut against the frame support portion 41 (see FIG. 9A). The upper projecting wall 46s projects downward from the second extended portion 46b and the lower projecting wall 41s projects upward from the frame support portion 41. Therefore, the solar cell panel 60 can be positioned by pressing the side surface intermediate portion 73b and the side surface lower portion 73c of the first frame 61a against the upper projecting wall 46s and the lower projecting wall 41s, respectively.

In this state, a space is present between the upper standing wall portion 45 and the upper projecting wall 46s. Therefore, before the first frame 61a is mounted, the upper standing wall portion 45 can be fastened to the side wall intermediate portion 73b of the decorative cover 63 with a small screw and the head of the small screw can be accommodated in the space. In addition, as described above, the distance from the upper standing wall portion 45 to the upper projecting wall 46s (and the lower projecting wall 41s) is set to be larger than the double of the distance between the extended surface of the side wall upper portion 73a and the side wall intermediate portion 73b. Therefore, a gap exists between the first frame 61a and the decorative cover 63 in a state in which the first frame 61a is closest to the decorative cover 63. With the formation of the gap, even when the first frame 61a and the decorative cover 63 made of metal thermally expand due to change in an air temperature, contact therebetween is prevented. Furthermore, even when the installation face 5 is inclined, load of the solar cell panel 60 can be prevented from acting on the decorative cover 63.

Moreover, in this state, the entire surface of the lower abutment portion 76 of the first frame 61a abuts against the frame support portion 41, and the projection 41p projects from the frame support portion 41 at the further inner side relative to the lower abutment portion 76. Accordingly, the first frame 61a installed on the frame support portion 41 can slide in the lengthwise direction but movement thereof in the direction orthogonal to the lengthwise direction is restricted by the projection 41p. In addition, in this state, the second extended portion 46b is at least partially inserted into the slit 74 of the first frame 61a. Therefore, even when upward force acts on the first frame 61a, interference between the slit 74 and the second extended portion 46b prevents upward movement.

That is to say, movements of the first frame 61a installed on the frame support portion 41 in both of the direction orthogonal to the lengthwise direction and the upward direction are restricted. Accordingly, in the operation of securing the solar cell panel 60 to the installation face 5 through the securing tool 1, the securing tool 1 is effectively prevented from being relatively detached from the slit 74 of the first frame 61a due to unintended movement of the solar cell panel 60, thereby performing the operation efficiently.

After the first frame 61a at the eaves side is completely secured, the first frame 61b of the same solar cell panel 60 at the ridge side is then secured. For this securing, the first extended portion 46a of a new securing tool 1 is inserted into the slit 74 of the first frame 61b at the ridge side and the securing tool 1 is made to slide to a position appropriate for the securing along the slit 74. The new securing tool 1 can be secured on the first frame 61b at the above-described stage at which the first frame 61a at the eaves side is supported on the previous securing tool 1.

Figure 9B:
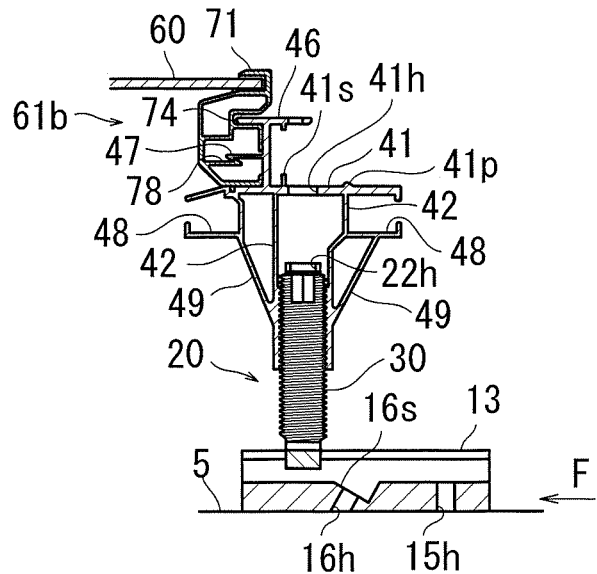

After the securing tool 1 is positioned relatively to the first frame 61b, the securing tool 1 is placed on the installation face 5 in a state in which the side surface intermediate portion 73b and the side surface lower portion 73c abut against the upper standing wall portion 45 of the securing tool 1, the lower abutment portion 76 is installed on the frame support portion 41 of the securing tool 1, and the first engaging piece 78 of the first frame 61b and the second engaging piece 47 of the securing tool 1 are engaged with each other (see FIG. 9B). The orientation of the securing tool 1 is set as in the above-mentioned manner. The position of the securing tool 1 on the installation face 5 is adjusted by causing the stand 20 to slide relatively to the base member 10 if necessary in a range in which the standing position of the stand 20 on the base member 10 is located at the eaves side relative to the inclined surface 16s as in the above-mentioned manner. After the position of the securing tool 1 is determined, the stand 20 is secured to the base member 10 as in the above-mentioned manner. The securing tool 1 is secured to the installation face 5 with the screws inserted through the hole portions 11h, 15h, and 16h as in the above-mentioned manner.

Furthermore, the holder 40 is moved up and down relatively to the stand 20 by rotating the shaft 30 with the tool inserted through the tool hole portions 41h and 22h in accordance with the necessity of height adjustment. That is to say, the height adjustment can be performed in the state in which the holder 40 of the securing tool 1 holds the solar cell panel 60 through the first frame 61b at the eaves side thereof.

Figure 9C:
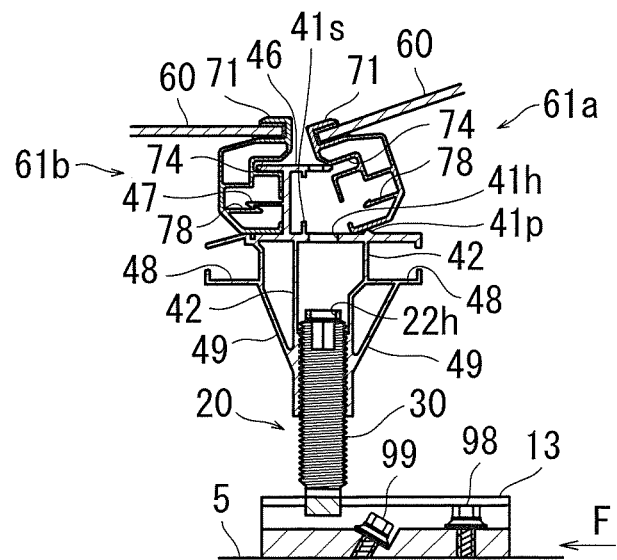

Next, the eaves-side first frame 61a of the solar cell panels 60 of a subsequent row (second row) is supported at the ridge side of the same securing tool 1 (see FIG. 9C). Then, as described above with reference to FIG. 8A, the solar cell panel 60 is inclined so as to be higher toward the ridge. After that, the solar cell panels 60 can be mounted in turn in one direction toward the ridge from the eaves by repeating the same operations as those described above, thereby constructing the securing structure for the solar cell panels 60.

In this securing structure, the securing tools 1 each of which is capable of moving up and down the holder 40 relatively to the stand 20 are used. It is possible to adjust the heights of the solar cell panels 60 in a state in which the solar cell panel 60 is supported through the first frame 61b held at the eaves side of the holder 40. It should be noted that the tool hole portions 41h is covered in the state in which the first frame 61a is held at the ridge side of the holder 40, and the height cannot therefore be adjusted. However, the securing structure in the embodiment is constructed by securing the solar cell panels 60 in turn in one direction toward the ridge from the eaves. It is therefore sufficient that the height adjustment can be performed in the state in which the solar cell panels 60 are held at the eaves side of the holders 40.

The securing structure in the embodiment is constructed by securing the solar cell panels 60 in one direction toward the ridge from the eaves. Therefore, the first frame 61b holding the solar cell panel 60 is present all the time at the eaves side relative to the upper standing wall portion 45 of the holder 40 in the securing tool 1 that is subsequently secured to the installation face 5. The upper standing wall portion 45 supporting the first frame 61b is located at the position deviating to the eaves side relative to the center axes of the stand 20.

The positions of the base member 10 through which the screws can be made to penetrate therefore deviate to the ridge side on the base member 10 naturally. As for this point, with the securing tool 1 in the embodiment, the inclined surface 16s is provided at the substantially center of the base member 10 in the lengthwise direction and the screw 99 inserted through the hole portion 16h formed through the inclined surface 16s is screwed into the installation face 5 to below the stands 20. The presence of the screw 99 that is obliquely screwed in this manner makes securing of the base member 10 to the installation face 5, eventually, securing of the solar cell panels 60 to the installation face 5 through the securing tool 1 more stable than the case of absence of the screw 99.

Figure 10A:
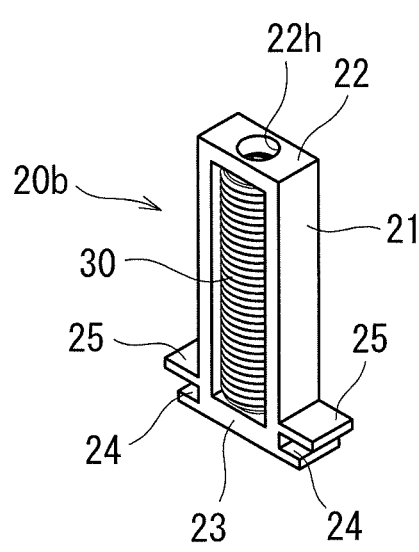
FIG. 10A is a perspective view of a variation of the stand as the component of the securing tool in FIG. 1
Figure 10B:
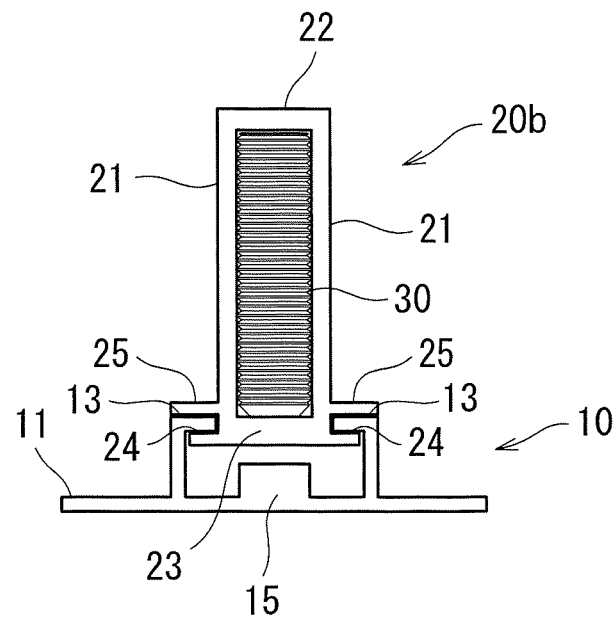
FIG. 10B is a front view in a state in which the stand in FIG. 10A is made to stand on the base member in FIG. 1.

In each securing tool 1, a stand 20b in a variation, which is illustrated in FIG. 10A and FIG. 10B, can be used instead of the stand 20. The stand 20b is different from the stand 20 in a point that the stand 20b includes no portion corresponding to the pair of bent pieces 25b extending from the respective end portions of the pair of flanges 25 in the stand 20 and other configurations of the stand 20b are the same as those of the stand 20.

The stand 20 can be secured to the base member 10 with the bolt 90 inserted through the thread hole 25f of one of the pair of bent pieces 25b and the screw inserted through the small hole 25h of the other one of the bent pieces 25b. The stand 20b does not have such a configuration. However, there is few necessity of something to prevent the stand 20b from moving to the ridge side, even if the movement of the stand 20b to the eaves side is restricted by any member such as a cover and a stopper only in each securing tool 1 that is secured to the installation face 5 at the most eaves side. This is because the movement of the stand 20b to the eaves side is restricted by interference between the head of the screw 99 that is inserted through the inclined surface 16s and the bottom surface portion 23, actually.

Furthermore, each securing tool 1 to be secured to the installation face 5 at a position which is not the most eaves-side position is not required to secure the stand 20 to the base member 10. As a reason of this, the securing tool 1 secured to the installation face 5 in an adjacent row at the eaves side relative to this securing tool 1 supports, through the first frame 61a, the solar cell panel 60 held by the first frame 61b that the securing tool 1 supports at the eaves side relative to the upper standing wall portion 45. In other words, in the completely constructed securing structure, sliding of the stand 20 in the securing tool 1 which is not located at the most eaves side in the inclination direction of the installation face 5 is restricted by the securing tool 1 which is located at the adjacent eaves side relative to the above-described securing tool 1.

Accordingly, even the securing tool 1 includes the stand 20b instead of the stand 20 can be used to construct the above-described securing structure with no problem to provide the same action effects.

Figure 11A:
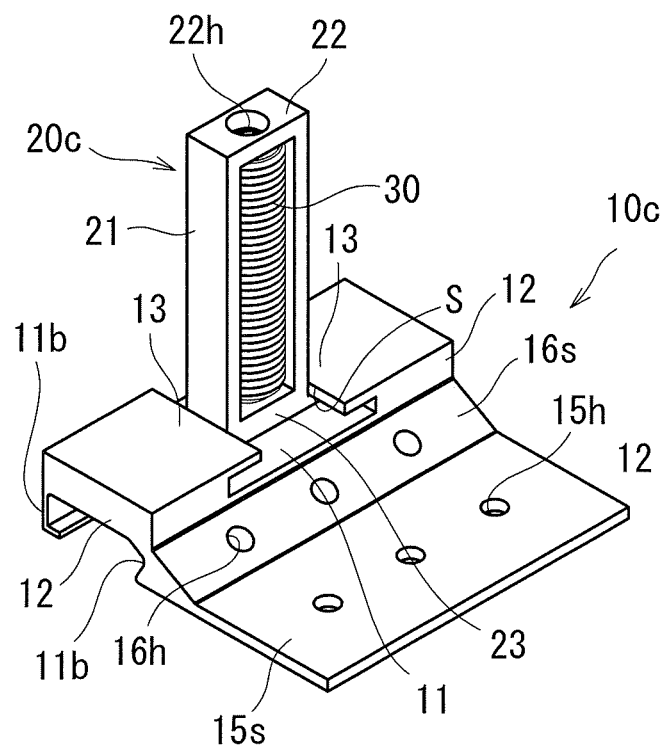
FIG. 11A is a perspective view of variations of the stand and the base member as the components of the securing tool in FIG. 1
Figure 11B:
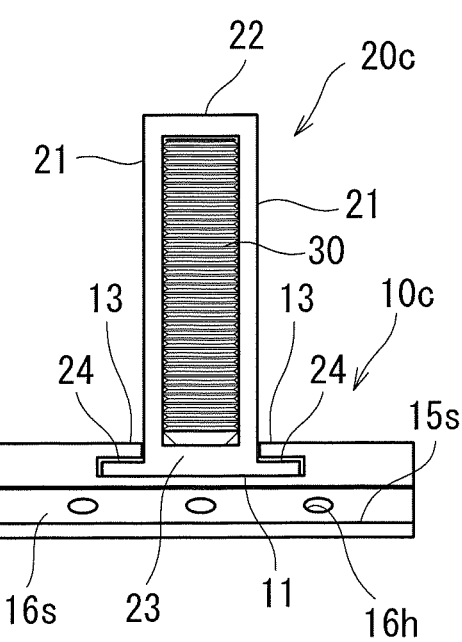
FIG. 11B is a side view of the stand and the base member in FIG. 11A.

Furthermore, in each securing tool 1, a base member 10c in a variation, which is illustrated in FIG. 11A and FIG. 11B, can be used instead of the base member 10 and a stand 20c can be used instead of the stand 20 so as to be compatible with the base member 10c. The base member 10c is different from the base member 10 in points that a pair of leg portions 11b supports the flat plate portion 11 at positions higher than the installation face 5 and has no protrusion 15 that projects upward from the flat plate portion 11 between the pair of base walls 12 in the base member 10. The parallel surface 15s formed on the protrusion 15 in the base member 10 corresponds to a surface abutting against the installation face 5 in the base member 10c and the inclined surface 16s is formed so as to connect the flat plate portion 11 and the parallel surface 15s. In the base member 10c, the parallel surface 15s and the inclined surface 16s have widths equal to a distance between the pair of base walls 12 and therefore have large areas, and respectively have the plurality of hole portions 15h and hole portions 16h. In response to the presence of the plurality of hole portions 16h, the plurality of screws 99 are obliquely screwed into the installation face 5. This makes securing of the base member 10c to the installation face 5, eventually, securing of the solar cell panels 60 to the installation face 5 through the securing tool 1 more stable. The hole portions 15h of the base member 10c also function as the hole portion 11h and the hole portion 15h in the base member 10.

In the base member 10c, a distances between the flat plate portion 11 and the lip pieces 13 is short and is substantially equal to the thickness of the guiding pieces 24 in response to the absence of the protrusion 15. The stand 20c does not include the flanges 25 that each of the stands 20 and 20b includes so as to be compatible with the above-described configuration of the base member 10c. Sliding of each of the stands 20 and 20b relative to the base member 10 is guided by interposing the lip pieces 13 between the guiding pieces 24 and the flanges 25. On the other hand, sliding of the stand 20c relative to the base member 10c is guided by interposing the guiding pieces 24 between the lip pieces 13 and the flat plate portion 11 and the configurations corresponding to the flanges 25 are therefore not necessary for the stand 20c. It should be noted that the stand 20c has no configuration for being secured to the base member 10c for the reason described above for the stand 20b.

FIG. 11A illustrates a state in which the length of the base slit S formed between the pair of lip pieces 13 in the base member 10c is smaller than the length of the base slit S in the base member 10. The base slit S capable of being used for causing each of the stands 20 and 20b to slide is however limited to an eaves-side portion relative to the inclined surface 16s also in the base member 10. In addition, in an actual construction place, the length that is necessary for causing the stand to slide for positional adjustment of the securing tool 1 is not so large. Accordingly, even the securing tool 1 includes the stand 10c instead of the stand 10 can be used to construct the above-described securing structure with no problem to provide the same action effects.

Although the present invention has been described above using the preferred embodiment, the present invention is not limited by the above-described embodiment and various improvements and changes in design can be made in a range without departing from the gist of the present invention as follows.

Figure 12:
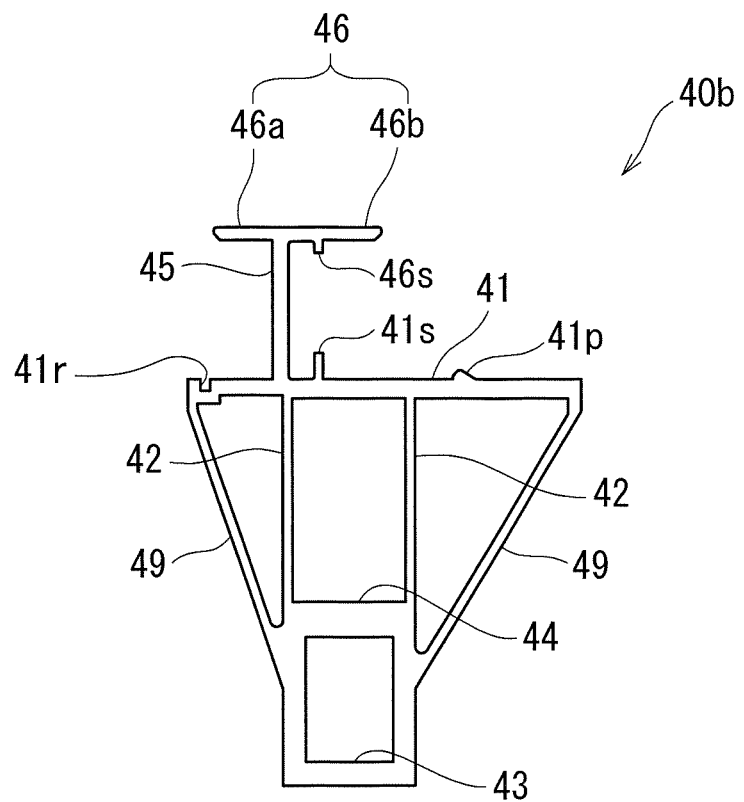
FIG. 12 is a front view of a variation of the holder as the component of the securing tool in FIG. 1.

For example, the securing tool 1 can include a holder 40b illustrated in FIG. 12 instead of the above-described holder 40. The holder 40b is different from the holder 40 in points that it includes no holding portion 48 holding the wire materials, both of the pair of lower standing wall portions 42 include no bent portion, the frame support portion 41 has no bent portion at the end portion side, and both of the pair of ribs 49 connect the lower standing wall portions 42 and the frame support portion 41. Other configurations thereof are the same as those of the holder 40. The holder 40b has an extremely simpler shape than that of the holder 40 and can be manufactured inexpensively. Even the securing tool 1 includes the holder 40b instead of the holder 40 can construct the above-described securing structure with no problem to provide the same action effects. A stand configuring the securing tool 1 together with the holder 40b may be any of the stands 20, 20b, and 20c.

In the above-described embodiment, the tool hole portion 22h is formed through the top surface portion 22 of the stand 20, as an example. The configuration is not limited thereto, and a stand having the configuration in which instead of the top surface portion, a pair of upper shelf portions extends from the vicinities of the upper ends of the pair of side wall portions of the stand toward the mating sides can be employed. Provision of a space between the pair of upper shelf portions on an extended line of the center axis of the shaft enables the tool to reach the tool engaging portion of the shaft through the space.

Furthermore, in the above-described embodiment, in each of the first frames 61a and 61b, not the entire surface of the side surface portion 73 is formed on the same plane but the side surface intermediate portion 73b and the side surface lower portion 73c on the same plane are located at the inner side relatively to the side surface upper portion 73a, as an example. The configuration is not limited thereto and the entire side surface portion 73 can be on the same plane in each of the first frames 61a and 61b. In this case, a gap corresponding to the distance between the upper standing wall portion 45 and the upper projecting wall 46s exists between the first frames 61a and 61b holding the adjacent solar cell panels 60.

What is claimed is:

1. A solar cell panel securing structure in which a pair of end sides of each solar cell panel is held by a pair of first frames and the first frames are secured to an installation face through securing tools,
    wherein each of the first frames includes:
        an upper abutment portion that abuts against an upper surface of the solar cell panel;
        a side surface portion that extends downward from one end of the upper abutment portion;
        an installation surface that extends from a halfway height position of the side surface portion in parallel with the upper abutment portion and holds the solar cell panel between the installation surface and the upper abutment portion in a state in which the solar cell panel is installed on the installation surface;

a slit that is opened at a halfway height position of the side surface portion below the installation surface and extends in a lengthwise direction of the first frame; and a lower abutment portion that extends from a lower end of the side surface portion in parallel with the upper abutment portion, each of the securing tools includes a base member that is secured to the installation face, a stand that is erected from the base member, a holder that is movable up and down relatively to the stand, and a shaft on which an external thread is formed on an outer circumferential surface, the stand has a pair of side wall portions and holds the shaft between the side wall portions in a state of restricting movement of the shaft in an axial direction, the shaft is exposed from the stand in a radial direction of the external thread and has a tool engaging portion on an end portion, the holder includes:

a frame support portion that is formed into a planar shape and through which a tool hole portion is formed;

an upper standing wall portion that extends upward at a position deviating from the tool hole portion on the frame support portion;

a lateral side extended portion that is formed by a first extended portion and a second extended portion extending from an upper end of the upper standing wall portion in both of directions orthogonal to the upper standing wall portion;

a pair of lower standing wall portions that extends downward from the frame support portion with the tool hole portion interposed between the lower standing wall portions;

internal threads that are formed on the pair of lower standing wall portions at positions facing each other;

a connecting portion that connects the pair of lower standing wall portions; and an insertion hole that is formed through the connecting portion, the external thread exposed from the stand inserted through the insertion hole is screwed together with the internal threads, the tool hole portion is located on an extended line of a center axis of the shaft and a hole portion or a space is formed on the extended line between the shaft and the tool hole portion in the stand; and the respective lower abutment portions of the two first frames that respectively hold the adjacent solar cell panels are installed on the frame support portion in a state in which the first extended portion of the securing tool has been inserted into the slit of one of the first frames and the second extended portion of the same securing tool has been inserted into the slit of the other one of the first frames.

2. A securing unit for securing a solar cell panel to an installation face, the securing unit including first frames for holding end sides of the solar cell panel and a securing tool for holding the first frames, wherein each of the first frames includes:

a flat plate-like upper abutment portion;

a side surface portion that extends downward from one end of the upper abutment portion;

an installation surface that extends from a halfway height position of the side surface portion in parallel with the upper abutment portion;

a slit that is opened at a halfway height position of the side surface portion below the installation surface and extends in a lengthwise direction of the first frame; and a lower abutment portion that extends from a lower end of the side surface portion in parallel with the upper abutment portion, the securing tool includes a base member having a flat plate portion, a stand that is erected from the base member, a holder that is moved up and down relatively to the stand, and a shaft on which an external thread is formed on an outer circumferential surface, the stand has a pair of side wall portions and holds the shaft between the side wall portions in a state of restricting movement of the shaft in an axial direction, the shaft is exposed from the stand in a radial direction of the external thread and has a tool engaging portion on an end portion, the holder includes:

a frame support portion that is formed into a planar shape and through which a tool hole portion is formed;

an upper standing wall portion that extends upward at a position deviating from the tool hole portion on the frame support portion;

a lateral side extended portion that is formed by a first extended portion and a second extended portion extending from an upper end of the upper standing wall portion in both of directions orthogonal to the upper standing wall portion;

a pair of lower standing wall portions that extends downward from the frame support portion with the tool hole portion interposed between the lower standing wall portions;

internal threads that are formed on the pair of lower standing wall portions at positions facing each other;

a connecting portion that connects the pair of lower standing wall portions; and an insertion hole that is formed through the connecting portion, the internal threads are screwed together with the external thread exposed from the stand inserted through the insertion hole, the tool hole portion is located on an extended line of a center axis of the shaft in a state in which the stand has been inserted through the insertion hole, and a hole portion or a space is formed on the extended line between the shaft and the tool hole portion in the stand; and the frame support portion is a portion on which the respective lower abutment portions of the two first frames are installed in a state in which the first extended portion of the securing tool has been inserted into the slit of one of the first frames and the second extended portion of the same securing tool has been inserted into the slit of the other one of the first frames.

* * * * *